(12) United States Patent
Adam et al.

(10) Patent No.: US 10,493,850 B2
(45) Date of Patent: Dec. 3, 2019

(54) METHOD AND DEVICE FOR THE PLAUSIBILITY CHECK OF SAFETY-RELEVANT VARIABLES

(71) Applicant: SIEMENS AKTIENGESELLSCHAFT, München (DE)

(72) Inventors: Alexander Adam, Weiden (DE); Marco Bohlländer, Hirschaid (DE); Björn Bögel, Abenberg (DE); Esther Llorente Àlvarez, Erlangen (DE); Caroline Lu, Bad Neustadt a.d. Saale (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/167,281

(22) Filed: May 27, 2016

(65) Prior Publication Data

US 2016/0347182 A1    Dec. 1, 2016

(30) Foreign Application Priority Data

May 29, 2015    (DE) .......................... 10 2015 209 897

(51) Int. Cl.
| | |
|---|---|
| *B60L 3/00* | (2019.01) |
| *B60L 3/12* | (2006.01) |
| *G07C 5/08* | (2006.01) |

(52) U.S. Cl.
CPC .............. *B60L 3/0061* (2013.01); *B60L 3/00* (2013.01); *B60L 3/12* (2013.01); *G07C 5/0808* (2013.01); *Y10S 903/904* (2013.01)

(58) Field of Classification Search
CPC . B60L 3/0061; B60L 3/00; B60L 3/12; G07C 5/0808; Y10S 903/904
See application file for complete search history.

(56) References Cited

U.S. PATENT DOCUMENTS

| | | | |
|---|---|---|---|
| 7,663,502 B2* | 2/2010 | Breed ..................... | B60C 11/24 340/12.25 |
| 9,043,062 B2* | 5/2015 | Miller ..................... | B60L 15/00 701/22 |

(Continued)

FOREIGN PATENT DOCUMENTS

DE    19745438 A1    4/1999

*Primary Examiner* — Jerrah Edwards
*Assistant Examiner* — Mathew Franklin Gordon
(74) *Attorney, Agent, or Firm* — Henry M. Feiereisen LLC (57) ABSTRACT

A method for a plausibility check of safety-relevant variables, wherein a first safety-relevant variable and a further safety-relevant variable are dependent on one another and are each provided to be raised from a lower safety level to a higher safety level. The plausibility check of the first safety-relevant variable is performed in a first time interval of a cycle of a clock by implementing a first plausibility rule, and upon a successful plausibility check during the first time interval, is raised from the lower safety level to the higher safety level for the safety-relevant variable. The plausibility check of the further safety-relevant variable is performed in a second time interval of the cycle of the clock by implementing a further plausibility rule, and upon a successful plausibility check during the second time interval, is raised from the lower safety level to the higher safety level for the further safety-relevant variable.

11 Claims, 3 Drawing Sheets

(56) References Cited

U.S. PATENT DOCUMENTS

| | | | |
|---|---|---|---|
| 9,933,472 B2* | 4/2018 | Barth | B60L 3/0046 |
| 2013/0249485 A1* | 9/2013 | Bohm | B60L 11/1811 |
| | | | 320/109 |
| 2014/0101642 A1 | 4/2014 | Kahne | |
| 2015/0032404 A1 | 1/2015 | Bohlländer et al. | |

* cited by examiner

METHOD AND DEVICE FOR THE PLAUSIBILITY CHECK OF SAFETY-RELEVANT VARIABLES

CROSS-REFERENCES TO RELATED APPLICATIONS

This application claims the priority of German Patent Application, Serial No. 10 2015 209 897.4, filed May 29, 2015, pursuant to 35 U.S.C. 119(a)-(d), the disclosure of which is incorporated herein by reference in its entirety as if fully set forth herein.

BACKGROUND OF THE INVENTION

The present invention relates to a method for checking the plausibility of safety-relevant variables, a data processing unit for performing the method and to an electrical converter for an electric or hybrid vehicle with the data processing unit.

The following discussion of related art is provided to assist the reader in understanding the advantages of the invention, and is not to be construed as an admission that this related art is prior art to this invention.

Products which are manufactured for industrial applications but also for end consumers must be technically and functionally designed such that their use does not put the safety of persons and the environment at risk. In the event of malfunctions, safe use with or without restrictions can in most cases be maintained for the vehicles offered by the automotive industry for instance. A safe shutdown must at least be ensured. To this end, safety-relevant components and systems which have to fulfill special safety requirements are identified in the motor vehicles.

Faulty functions, an inadequate availability or a complete failure of these safety-relevant components or systems can put persons, dependent components and systems and also processes in danger such that there is potential risk which has to be observed more closely.

A known method from the industrial environment referred to as Safety Integrity Level (SIL) is applied in order to determine the potential risks to which persons, the dependent components and systems, as well as the processes are exposed in the event of malfunctions of industrial products, for example, and which they are able to withstand.

The basis for the specifications, the design and operation of potentially high-risk components or systems in products or industrial systems forms an International Electrotechnical Commission (IEC) standard with the reference IEC 61508.

Particularly for the automotive industry, but also for the development and use of electric or hybrid vehicles, an automotive standard with the reference ISO 26262 was introduced, which replaces the current SIL industry specifications with a more suitable Automotive Safety Integrity Level (ASIL). The basic idea behind the method of ASIL is to evaluate functions of components or system and to provide these with respect to potential risks. ASIL thus notably evaluated the risks of potentially safety-relevant functions, which occur in the event of a malfunction in the vehicle and may have an impact on the integrity of the driver and other road users.

The ASIL method has four levels of risk. The ASIL levels of risk are labeled with the letters A, B, C and D. Each level of risk determines a risk potential which is ten times higher than that of the previous level. While ASIL-A has the lowest level of risk, ASIL-D accordingly has a risk potential which is ten thousand times higher than ASIL-A.

The safety-relevant functions which are identified and evaluated for electric or hybrid vehicles by means of the ASIL method and which are implemented for instance in the form of regulation functions in the converter of the electric drive system in most cases require a plurality of external and internal parameters for their implementation, which are attributable both to the measured and also the calculated variables.

These measured or calculated variables which process or generate the safety-relevant functions are therefore safety-relevant variables and must also be evaluated by means of the ASIL method. In this context, it is irrelevant whether the safety-relevant variable has a physical basis or another basis, such as an exclusively mathematical basis, for example.

Decisive for the use of the safety-relevant variables in conjunction with the safety-relevant functions which are classified by ASIL is the need for the safety-relevant variables for the correspondingly specified or required ASIL level of risk, also referred to below as safety level or ASIL level, to be evaluated and provably checked, in other words plausibility checked.

If a safety-relevant variable is required for instance, which should correspond to the requirements of the ASIL level D, but until now only fulfilled the requirements of the ASIL level A, measures must be taken to ensure that this safety-relevant variable will take the requirements of the higher ASIL level into account. This means that a safety-relevant variable which is assigned to a higher ASIL level can be used for safety-relevant functions, the potential failure of which is associated with a higher potential risk.

To ensure that a safety-relevant variable can be raised from a lower safety level to a higher safety level, a plausibility check of the safety-relevant variable is therefore generally performed, wherein specific plausibility rules are applied hereto.

A plausibility rule may mean that instead of one measurement, at least two or more independent measurements of the safety relevant variable have to be performed for the higher safety level. A valid statement can be achieved by means of known evaluation methods to determine whether the safety-relevant variable can be applied to the requirements of the higher safety level. With for instance three independent measurements, a known evaluation method of selecting "two out of three" can be applied. As a result, the requirements of the higher safety level can still be fulfilled for the safety-relevant variable even if one measurement fails.

Nevertheless, the technical and administrative outlay cannot be ignored if a number of measurements have to be retained for one safety-relevant variable. The need for maintenance measures is thus also clearly apparent from the use of a plurality of suitable measuring points.

One further possibility of determining and checking the plausibility of a safety-relevant variable is its calculation, in particular, including one or a number of additional safety-relevant variables, which already correspond to the requirements of a higher safety level. These additional safety-relevant variables have a physical or mathematical dependency in relation to the safety-relevant variable which is still to be plausibility checked and allow a transformation to a higher safety level by means of the technical facts.

If a safety-relevant variable is plausibility checked for a higher safety level in accordance with the known procedure, this is however only possible during operation by a time-continuous plausibility check of this one safety-relevant variable by means of the transformation. If a number of safety-relevant variables, which are disposed below one another in the previously mentioned dependency, are to be plausibility checked as simultaneously as possible and raised to a higher safety level, the plausibility check takes place by a plurality of transformations which run in parallel in each case, wherein the software functions or corresponding hardware functions designed for this purpose are called up and performed in parallel at the same time. These time-continuous plausibility functions which run in parallel in the form of software functions often generate a permanently high computing load, wherein the outlay for suitable hardware is also to be taken into account.

It would therefore be desirable and advantageous to provide an improved method for checking the plausibility of safety-relevant variables which obviates prior art shortcomings and is of simple and inexpensive structure while yet being reliable in operation.

SUMMARY OF THE INVENTION

According to one aspect of the present invention, a method for checking a plausibility of safety-relevant variables includes providing a first safety-relevant variable and at least one further safety-relevant variable, wherein the first safety-relevant variable and the further safety-relevant variable are dependent on one another and are each configured to be raised from a lower safety-level to a higher safety level, performing a first plausibility check of the first safety-relevant variable in a first time interval of a cycle of a clock by implementing a first plausibility rule, wherein the first safety-relevant variable is raised from the lower safety level to the higher safety level for the first safety-relevant variable upon a successful first plausibility check during the first time interval of the cycle of the clock, and performing a second plausibility check of the further safety-relevant variable in a second time interval of a cycle of a clock by implementing a further plausibility rule, wherein the further safety-relevant variable is raised from the lower safety level to the higher safety level for the further safety-relevant variable upon a successful second plausibility check during the second time interval of the cycle of the clock.

The safety-relevant variables which are to be plausibility checked are generally physically dependent on one another. The first safety-relevant variable can therefore be deduced or derived from the further safety-relevant variable and vice versa by means of physical formulae or mathematical associations. This mutual dependency results accordingly from the technically motivated facts and the technical environment associated therewith.

This situation of mutual dependency of the first safety-relevant variable and further safety-relevant variable is used so that beginning with the first time interval of the cycle of the clock, the first safety-relevant variable is raised to a higher safety level by means of the first plausibility rule, wherein the further safety-relevant variable is included in the first plausibility rule. If the result from the first plausibility rule corresponds to the requirements of the required higher safety level, then the plausibility check of the first safety-relevant variable is successful within the first time interval of the cycle of the clock. The first safety-relevant variable is thus raised in the first time interval of the cycle from the lower safety level to the higher safety level, so that the first safety-relevant variable is evaluated as valid in respect of the higher safety level.

Comparable with this procedure is the application of the method of the present invention to the plausibility check of the further safety-relevant variable, wherein within the second time interval of the cycle of the clock, the further safety-relevant variable is likewise raised from the lower safety level to the higher safety level with a successful plausibility check by means of the further plausibility rule. The first safety-relevant variable is included here in the further plausibility rule.

The first safety-relevant variable can be plausibility checked during the first time interval of the cycle, whereas the further safety-relevant variable can only be plausibility checked during the second time interval of the cycle. The method of the present invention can also be characterized as a time-discontinuous crossover plausibility check of the safety-relevant variables within the cycle of the clock.

For the sequential course of the plausibility check of the first and further safety-relevant variables, the two time intervals of the cycle are selected such that sufficient time is available to perform the respective plausibility check. However, it must be possible to use sufficient time for processing the safety-relevant variables, which have been raised to the higher safety level, for the safety-relevant components or systems until a next value of the safety-relevant variable is determined and plausibility checked.

A factually complete time-synchronous provision of a number of safety-relevant variables is possibly only required in rare cases. A small time offset for the safety-relevant variables to be plausibility checked in each case is therefore sufficient in the majority of safety-relevant applications.

The inventive method advantageously shows that it is possible to dispense with parallel method steps for the plausibility check of safety-relevant variables, as are known from previous plausibility methods. The frequently used multiple measurements for a safety-relevant variable can also be largely reduced. The plausibility check of the safety-relevant variables is therefore in principle performed in an overlapping and time-discontinuous manner.

According to another advantageous feature of the present invention, the plausibility rules can each have a calculation function configured to perform the plausibility checks of the safety-relevant variables at the higher safety level.

The calculation function of the respective plausibility rule refers to the physical formulae or mathematical associations which are required in accordance with the technical facts, by means of which the safety-relevant variables can be determined and moreover plausibility checked. If the first safety-relevant variables are to be plausibility checked in the first time interval of the cycle for instance, the further safety relevant variable which has not been plausibility checked at this point is generally included in the calculation function of the first plausibility rule. The same can also apply, accordingly adjusted, to the inclusion of the first safety-relevant variable in the calculation function for the further plausibility rule for determining and plausibility checking the further safety-relevant variable in the second time interval of the cycle.

These additional calculation variables can already be plausibility-checked safety-relevant variables but also system-immanent constants or parameters, such as, for instance, a degree of efficiency of a converter, on the basis of which the safety-relevant variable to be plausibility checked can be determined and plausibility checked as a result of the plausibility rule.

According to another advantageous feature of the present invention, in addition to the safety-relevant variables, at least one additional calculation variable can be included in the calculation function of the plausibility rules.

According to another advantageous feature of the present invention, the method can be repeatedly performed by repeating the cycle of the clock.

The safety-relevant variables can now be determined cyclically, raised to a higher safety level with a successful plausibility check and thus updated for control or regulation systems of safety-relevant components and systems, for example.

According to another advantageous feature of the present invention, a cycle duration of the cycle of the clock, within which the plausibility checks of the first safety-relevant variable and the further safety-relevant variable and the raising from the lower safety level to the higher safety level is performed, does not exceed a latency time for a safety event to be monitored.

With a monitoring of safety events for safety-relevant components or systems of products, calculations of a variable to be monitored and which characterizes the safety event frequently take place. Examples of the monitoring of safety events, or in most cases physical variables to be monitored, would be to monitor an exceeding of a maximum output or a maximum torque of an electric drive system.

Both the first safety-relevant variable and also the further safety-relevant variable, which have to be plausibility checked beforehand from the lower safety level to the required higher safety level variable within the corresponding cycle duration of the clock can be included in these calculations. Depending on the requirement of the ASIL method and the technical facts, the latency time now determines a duration of the generally cyclical monitoring of the safety event, while the one actual change in the variable to be monitored has at least no negative influence on the safety of the application.

The first safety-relevant variable and also the further safety relevant variable can now be determined in the duration of less than the latency time and is plausibility checked for a correspondingly higher safety level and the monitoring of the variable of the safety event to be monitored is performed. A temporal exceeding of this latency time by the cited activities can compromise the monitoring of the safety event and as a result risk the safety of the application which is associated therewith.

According to another advantageous feature of the present invention, the first time interval of the cycle of the clock and the second time interval of the cycle of the clock can have a same duration.

According to another advantageous feature of the present invention, the first time interval of the cycle of the clock and the second time interval of the cycle of the clock do not have a same duration.

Both cited advantageous embodiments allow for a flexible temporal adjustment to a respective temporal requirement to perform the two plausibility rules. If one of the two plausibility rules requires more time than the other, this can be advantageously realized by displacing the two time intervals within the cycle of the clock.

According to another advantageous feature of the present invention, the first plausibility rule and/or the further plausibility rule can include a comparison operation for determining success of the plausibility check, configured to compare the safety-relevant variables, which are to be raised from the lower safety level to the higher safety level, with the safety-relevant variables which are provided but not yet plausibility checked by the plausibility rules.

This comparison operation forms part of the plausibility rule and compares a measured value for instance which represents the respective safety-relevant variable prior to its plausibility check with the safety-relevant variable calculated within the plausibility rule. If the comparison produces a deviation which is acceptable within previously defined tolerances, the safety-relevant variable can then be plausibility checked and raised to the higher safety level. An extension to the plausibility rules associated therewith increases the quality or validity of the plausibility check.

According to another advantageous feature of the present invention, a data processing unit can perform the method for checking a plausibility of safety-relevant variables. The data processing unit may include a first input for receiving a first safety-relevant variable, at least one further input for receiving at least one further safety-relevant variable, at least one additional input for receiving at least one additional calculation variable, a first output for outputting the first safety-relevant variable, wherein the first output is plausibility checked and raised to a higher safety level, and at least one further output for outputting the further safety-relevant variable, wherein the at least on further output is plausibility checked and raised to the higher safety level.

According to another advantageous feature of the present invention, an electrical converter for an electric or hybrid vehicle with a data processing unit can perform the method for checking a plausibility of safety-relevant variables. The electrical converter may include a first input for receiving a first safety-relevant variable, at least one further input for receiving at least one further safety-relevant variable, at least one additional input for receiving at least one additional calculation variable, a first output for outputting the first safety-relevant variable, wherein the first output is plausibility checked and raised to a higher safety level, and at least one further output for outputting the further safety-relevant variable, wherein the at least on further output is plausibility checked and raised to the higher safety level.

The term electric or hybrid vehicle can also include air vehicles and rail vehicles, which are electrically operated exclusively or partially. The electrical converters, in particular driven by a plurality of innovative technical solutions in electric or hybrid vehicles, also increasingly require a higher safety-relevant level, due to ASIL methods to be used increasingly, the level being supported by the inventive data processing unit, which can perform the method of the present invention.

According to another advantageous feature of the present invention, the electrical converter can be a DC voltage converter for converting DC voltages between a high voltage DC voltage circuit and a low voltage DC voltage circuit.

These DC voltage converters are used in electric or hybrid vehicles for various scopes of application. These range from tasks involving communication and on-board power supplies to the described power electronic energy conversion between DC voltage circuits.

According to another advantageous feature of the present invention, the electrical converter can be a traction converter for operating an electrical machine.

According to another advantageous feature of the present invention, the traction converter can be a DC voltage converter for converting DC voltages between a high voltage DC voltage circuit and a low voltage DC voltage circuit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
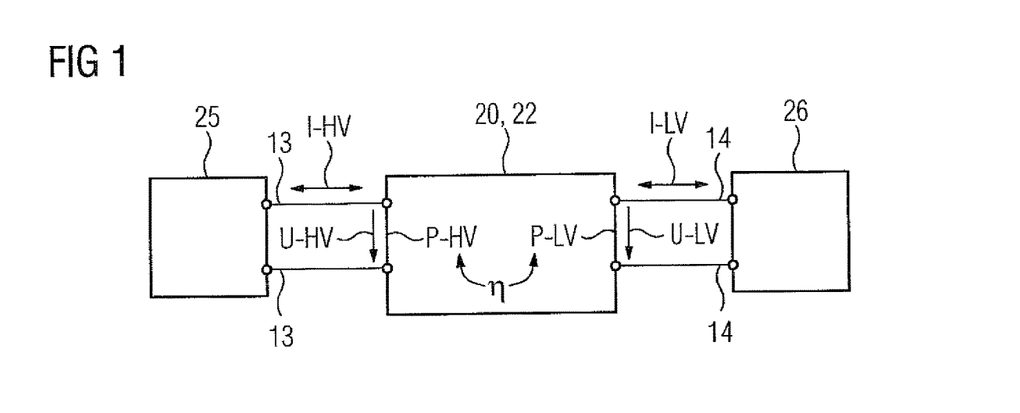
FIG. 1 shows a schematic representation of a DC voltage converter of the present invention, electrically connected between a high-voltage DC voltage circuit and a low-voltage DC voltage circuit with safety-relevant variables selected by way of example.

Turning now to the drawing, and in particular to FIG. 1, there is shown a schematic representation of a DC voltage converter 22 electrically connected between a high-voltage DC voltage circuit 13 on the high-voltage side energy store 25 and a low-voltage DC voltage circuit 14 on the low-voltage side energy store 26. FIG. 1 is a suitable example of showing electrical variables which physically characterize a safety-relevant component or system and can be identified and evaluated as safety-relevant variables for safety functions according to the ASIL method.

By way of example, at least the high-voltage side DC current I-HV and the low-voltage side DC current I-LV were identified here as safety-relevant variables in FIG. 1, wherein if applicable the high-voltage side DC voltage U-HV and the low-voltage side DC voltage U-LV can also be evaluated in this sense. In application, these values are, among other things, determined for safe control and regulation functions of an electrical converter 20, in other words the DC voltage converter 22 shown here, via calculation algorithms or measurements.

The DC currents I-HV, L-HV identified as safety-relevant variables have an electrical, in other words, physical dependency. Indeed, if at least one of the DC currents I-HV, L-HV was, if applicable, already determined via measurement or preceding calculation, both DC currents I-HV, I-LV are however not yet plausibility checked for a higher safety level.

With the aid of additionally known variables, such as the high-voltage side DC voltage U-HV, the low-voltage side DC voltage U-LV and the electrical efficiency level η of the DC voltage converter 22 and further calculation variables, such as the high-voltage side power P-HV (here power draw of the DC-DC converter 22) and the low-voltage side power P-LV (here output power of the DC voltage converter 22), this dependency can be mathematically described as follows:

$$P\text{-}HV = U\text{-}HV * \underline{I\text{-}HV}$$

$$P\text{-}LV = P\text{-}HV * \eta$$

$$\underline{I\text{-}LV} = P\text{-}LV / U\text{-}LV$$

The indicated dependency of the two DC currents I-HV, I-LV identified by way of example as safety-relevant variables can thus basically be used, by means of the known variables U-HV, U-LV, q, which are if necessary safety-relevant and already plausibility checked at a higher safety level, to determine the safety-relevant variables of the DC currents I-HV, I-LV, to plausibility check the same and thus likewise to raise them to a higher safety level.

Figure 2:
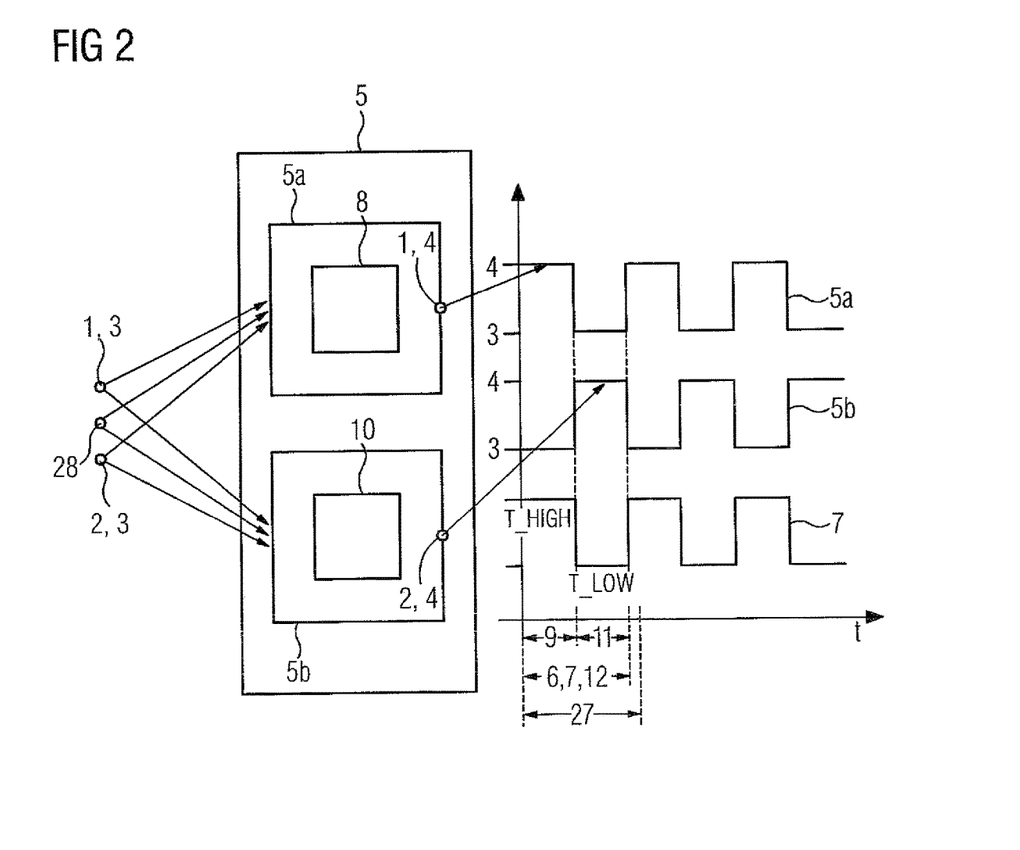
FIG. 2 shows a schematic representation of the method of the present invention, by means of which selected safety-relevant variables are plausibility checked at a higher safety level.

The schematic representation in FIG. 2 is now described in detail as to how, by means of the method of the present invention, a plausibility check 5, 5a, 5b of the DC currents I-HV, I-LV already identified as safety relevant variables 1, 2 in FIG. 1 in the example of the DC voltage converter 20, which are to be plausibility checked in each case from a lower safety level 3 to a higher safety level 4, is performed.

FIG. 2 visualizes that a clock 7 is predetermined, which alternately assumes a state with an upper clock level T_HIGH and a lower clock level T_LOW.

Together the two clock levels T_HIGH, T_LOW correspond in time to a cycle 6, wherein a first time interval 9 runs in the presence of the upper clock level T_HIGH and a second time interval 11 of cycle 6 runs in the presence of the lower clock level T_LOW. Both time intervals 9, 11 together produce the cycle duration 12 of the cycle 6 of the clock 7.

If the inventive method starts with the present upper clock level T_HIGH of the clock 7 for instance, in the first time interval 9 of the cycle 6, a first safety-relevant variable 1 previously assigned to the lower safety level 3 is plausibility checked by a first plausibility rule 8. The first plausibility rule 8 in most cases takes place in the form of a calculation, such as was indicated for instance in the description relating to FIG. 1. Additional calculation variables 28 can also be included in the calculation function.

For improved understanding, the entire event of the plausibility check 5 is graphically divided once again into the plausibility check 5a of the first safety-relevant variable 1 and into the plausibility check 5b of a further safety-relevant variable 2.

If the first safety-relevant variable 1 is present as a measured value of a measurement, for example, before the start of the plausibility check 5a, this originally measured value can be compared with the first safety-relevant variable 1 calculated during performance of the first plausibility rule 8. Upon a successful comparison, these are then raised to the higher safety level 4 as a safety-relevant variable 1.

The comparison is generally successful if there is no deviation greater than a predetermined tolerance range between the values of the first safety relevant variable 1 to be compared.

The plausibility check 5a must be concluded for the first safety-relevant variable 1 within the first time interval 9 of the cycle 6 of the clock 7 (upper clock level T_HIGH).

As with the plausibility check 5a of the first safety-relevant variable 1 at the higher safety level 4, the plausibility check 5b of the further safety-relevant variable 2, which is still disposed on the lower safety level 3, can now be performed once the lower clock level T_LOW of the clock 7 is present. In the second time interval 11 of the cycle 6 of the clock 7, the further safety-relevant variable 2 is plausibility checked at the higher safety level 4 by means of a further plausibility rule 10. Similar to the plausibility check 5a of the first safety-relevant variable 1, this also in most cases takes place in the form of a calculation, as shown by way of example in the description of FIG. 1. Additional calculation variables 28 can also be included here in the calculation function.

It is possible to compare the further safety-relevant variable 2 already determined before the plausibility check 5b but still not at the lower safety level 3 and accordingly still not plausibility checked with the further safety-relevant variable 2 which is calculated during the further plausibility rule 10 and then, with a successful comparison, to raise this to the higher safety level 4 as a further safety-relevant variable 2.

The comparison is generally successful, as previously described, if there is no deviation greater than a predetermined tolerance range between the values of the further safety relevant variable 2 to be compared.

The plausibility check 5b of the further safety-relevant variable 2 must therefore be concluded within the second time interval 11 of the cycle 6 of the clock 7 (lower clock level T_LOW).

If both the first and also the further safety-relevant variable 1, 2, which were raised to a higher safety level 4 within a cycle 6 of a clock 7, are required in order to validate or check the plausibility of a safety function of a safety event within a latency time 27, the plausibility check 5a, 5b of the respective safety-relevant variable 1, 2 must be concluded within the cycle duration 12 of the cycle 6 of the clock 7. Similarly, the safety function to be checked by including the plausibility-checked safety-relevant variables 1, 2 must then be evaluated.

There is thus a requirement that the cycle duration 12 for the two safety-relevant variables 1, 2 to be plausibility checked is not permitted to exceed the latency time 27 of the safety function associated with the safety event.

Figure 3:
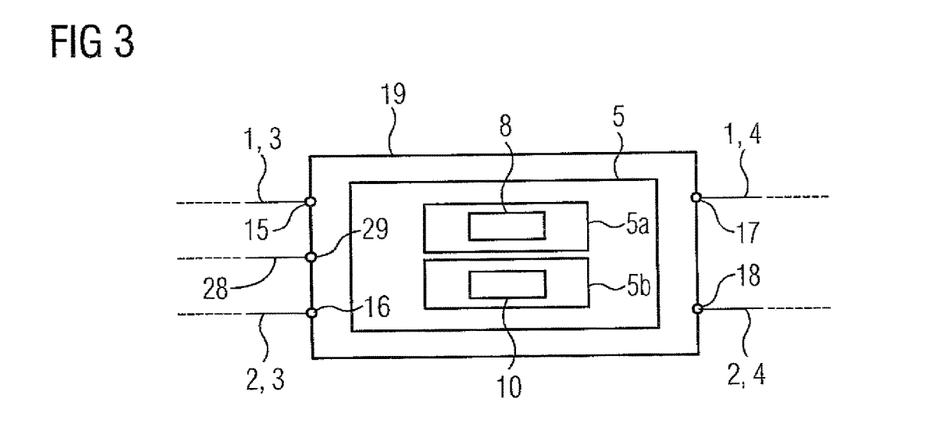
FIG. 3 shows a schematic representation of a data processing unit for performing the method of the present invention.

A data processing unit 19 which executes the inventive method, in other words the plausibility check 5, 5a, 5b of safety-relevant variables 1, 2, by plausibility rules 8, 10, is shown schematically in FIG. 3.

A data processing unit 19 has a first input 15 for receiving a first safety-relevant variable 1 still disposed at a lower safety level 3, a second input 16 for receiving a further safety-relevant variable 2 still disposed at the lower safety level 3, and an additional input 29 for receiving at least one additional calculation variable 28.

Furthermore, the data processing unit 19 has a first output 17 for outputting the first safety-relevant variable 1 disposed at a higher safety level 4 and a second output for outputting the further safety-relevant variable 2 disposed at the higher safety level 4.

Figure 4:
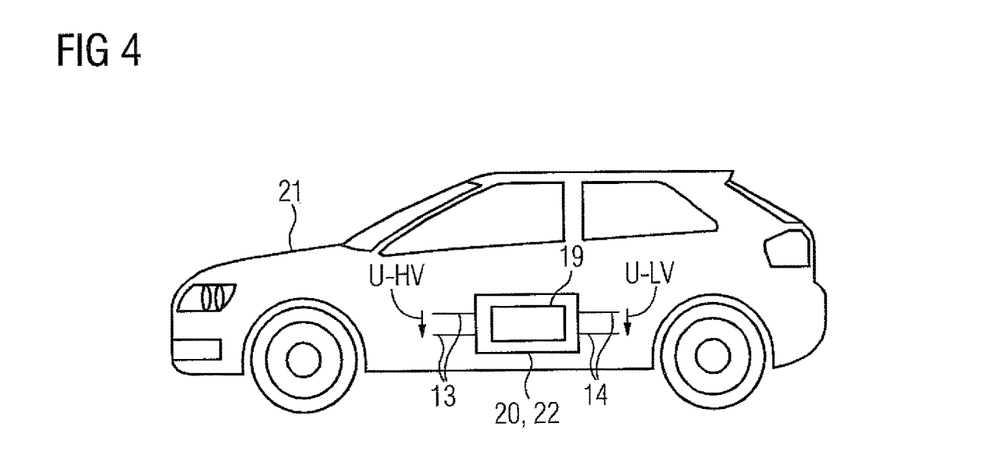
FIG. 4 shows a first schematic representation of an electric or hybrid vehicle having an electrical converter, which is a DC voltage converter according to FIG. 1 and a data processing unit according to FIG. 3.

A first schematic representation of an electric or hybrid vehicle 21 with an electrical converter 20 is shown in FIG. 4, wherein the electrical converter 20 has a DC voltage converter 22 according to FIG. 1 and a data processing unit 19 according to FIG. 3.

DC voltage converters 22 are often used repeatedly in electric or hybrid vehicles 21 and are required for a conversion of different DC voltage planes. As previously described, they are in most cases also part of safety-relevant components or systems or themselves represent a safety-relevant component or system of this type. The DC voltage converter 22 is provided in FIG. 4 to perform the conversion of DC voltages U-HV, U-LV between a high-voltage DC voltage circuit 13 and a low-voltage DC voltage circuit 14.

Figure 5:
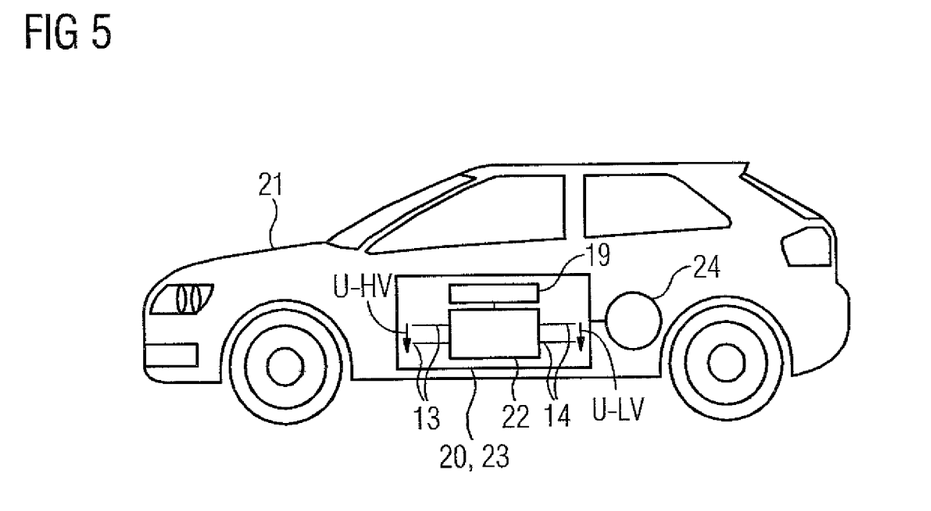
FIG. 5 shows a further schematic representation of an electric or hybrid vehicle having an electrical converter, which is a traction converter and has a DC voltage converter according to FIG. 1 and a data processing unit according to FIG. 3.

A further schematic representation of an electric or hybrid vehicle 21 is shown in FIG. 5 with an electrical converter 20, wherein this electrical converter 20 is embodied as a traction converter 23, by means of which an electric machine 24 can be operated. The traction converter 23 has a DC voltage converter 22 according to FIG. 1 and a data processing unit 19 according to FIG. 3. The DC voltage converter 22 is provided within the traction converter 23 to perform a conversion of DC voltages U-HV, U-LV between a high-voltage DC voltage circuit 13 and a low-voltage DC voltage circuit 14.

In the exemplary embodiment in FIG. 5, the data processing unit 19 is provided as an autonomous safety-relevant component within the traction converter 23 and in this case has an additional connection for a data exchange of the required safety-relevant variables or the additional calculation variables with the DC voltage converter 22. An integration of the data processing unit 19 into the DC voltage converter 22 is entirely meaningful and possible here, as already shown in FIG. 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for raising plausibility of interdependent safety-relevant electrical variables of an electrical DC-DC converter, the safety-relevant variables being selected from the group consisting of DC current and DC voltage from a high voltage side and a low voltage side of the electrical converter, the method comprising:

providing a first safety-relevant variable and at least one further safety-relevant variable measured on the electrical DC-DC converter to an input of a data processing unit controlling the electrical DC-DC converter and are each and configured to raise the first safety-relevant variable and at least one further safety-relevant variable from a lower safety-level to a higher safety level;

performing with the data processing unit a first plausibility check of the first safety-relevant variable in a first time interval of a cycle of a clock by implementing a first plausibility rule, wherein the first safety-relevant variable is raised from the lower safety level to the higher safety level for the first safety-relevant variable upon a successful first plausibility check during the first time interval of the cycle of the clock;

performing with the data processing unit a second plausibility check of the further safety-relevant variable in a second time interval of a cycle of a clock by implementing a further plausibility rule, wherein the further safety-relevant variable is raised from the lower safety level to the higher safety level for the further safety-relevant variable upon a successful second plausibility check during the second time interval of the cycle of the clock; and with the data processing unit controlling electrical variables of the electrical DC-DC converter commensurate with the safety-relevant variable and the further safety-relevant variable being raised from the lower safety level to the higher safety level.

2. The method of claim 1, wherein the plausibility rules each have a calculation function configured to perform the plausibility checks of the safety-relevant variables at the higher safety level.

3. The method of claim 2, wherein in addition to the safety-relevant variables, at least one additional calculation variable is included in the calculation function of the plausibility rules.

4. The method of claim 1, wherein a cycle duration of the cycle of the clock, within which the plausibility checks of the first safety-relevant variable and the further safety-relevant variable and the raising from the lower safety level to the higher safety level is performed, does not exceed a latency time for a safety event to be monitored, wherein the latency time is that time required to monitor an exceeding of the variable.

5. The method of claim 4, wherein the first time interval of the cycle of the clock and the second time interval of the cycle of the clock have a same duration.

6. The method of claim 4, wherein the first time interval of the cycle of the clock and the second time interval of the cycle of the clock do not have a same duration.

7. The method of claim 1, wherein the first plausibility rule and/or the further plausibility rule includes a comparison operation for determining success of the plausibility check, configured to compare the safety-relevant variables, which are to be raised from the lower safety level to the higher safety level, with the safety-relevant variables which are provided but not yet plausibility checked by the plausibility rules.

8. The method of claim 1, wherein the method is repeatedly performed by repeating the clock cycle.

9. A data processing unit controlling an electrical DC-DC converter, comprising:
a first input for receiving a first safety-relevant variable measured on the DC-DC converter;
at least one further input for receiving at least one further safety-relevant variable, the first safety-relevant variable and the further safety-relevant variable being selected from the group consisting of DC current and DC voltage from a high voltage side and a low voltage side of an electric converter, wherein the first safety-relevant variable and the further safety-relevant variable are dependent on one another;
at least one additional input for receiving at least one additional calculation variable;
a first output for outputting the first safety-relevant variable, said first output being plausibility checked with a first plausibility rule during a first part of a clock cycle and raised to a higher safety level when a deviation between the first safety-relevant variable and the plausibility-raised first safety-relevant variable is acceptable within previously defined tolerances; and
at least one further output for outputting the further safety-relevant variable, said at least one further output being plausibility checked with a second plausibility rule during a second part of a clock cycle and raised to the higher safety level when the deviation between the further safety-relevant variable and the plausibility-raised further safety-relevant variable is acceptable within previously defined tolerances,
said data processing unit configured to control electrical variables of the electrical DC-DC converter commensurate with the safety-relevant variable and the further safety-relevant variable being raised from the lower safety level to the higher safety level.

10. An electrical DC-DC converter for an electric or hybrid vehicle, said electrical DC-DC converter comprising a a data processing unit which controls the electrical DC-DC converter and includes a first input for receiving a first safety-relevant variable, at least one further input for receiving at least one further safety-relevant variable, the first safety-relevant variable and the further safety-relevant variable being selected from the group consisting of DC current and DC voltage from a high voltage side and a low voltage side of an electric converter, wherein the first safety-relevant variable and the further safety-relevant variable are dependent on one another, at least one additional input for receiving at least one additional calculation variable, a first output for outputting the first safety-relevant variable, said first output being plausibility checked with a first plausibility rule during a first part of a clock cycle and raised to a higher safety level when a deviation between the first safety-relevant variable and the plausibility-raised first safety-relevant variable is acceptable within previously defined tolerances; and
at least one further output for outputting the further safety-relevant variable, said at least one further output being plausibility checked with a second plausibility rule during a second part of a clock cycle and raised to the higher safety level when the deviation between the further safety-relevant variable and the plausibility-raised further safety-relevant variable is acceptable within previously defined tolerances,
said electrical DC-DC converter configured to convert high-voltage DC current to low-voltage DC current commensurate with the safety-relevant variable and the further safety-relevant variable received from the data processing unit that have been raised from the lower safety level to the higher safety level.

11. The electrical converter of claim 10, wherein the electrical converter comprises a traction converter for operating an electrical machine.

* * * * *

UNITED STATES PATENT AND TRADEMARK OFFICE
CERTIFICATE OF CORRECTION

PATENT NO. : 10,493,850 B2  
APPLICATION NO. : 15/167281  
DATED : December 3, 2019  
INVENTOR(S) : Alexander Adam et al.

Page 1 of 1

It is certified that error appears in the above-identified patent and that said Letters Patent is hereby corrected as shown below:

In the Claims

Column 10, Claim 1, Line 42-43: after "DC-DC converter" delete "and are each".

Column 12, Claim 10, Line 16: after "comprising" delete the word "a".

Signed and Sealed this  
Eighteenth Day of February, 2020

Andrei Iancu  
*Director of the United States Patent and Trademark Office*